United States Patent
Lichtinger et al.

(10) Patent No.: US 10,454,351 B2
(45) Date of Patent: *Oct. 22, 2019

(54) ROTOR, METHOD FOR PRODUCING A ROTOR, ASYNCHRONOUS MACHINE, AND VEHICLE

(71) Applicant: Bayerische Motoren Werke Aktiengesellschaft, Munich (DE)

(72) Inventors: Josef Lichtinger, Munich (DE); Holger Ulbrich, Munich (DE); Manfred Siegling, Munich (DE)

(73) Assignee: Bayerische Motren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,137

(22) Filed: Jun. 6, 2018

(65) Prior Publication Data

US 2018/0287468 A1    Oct. 4, 2018

Related U.S. Application Data

(63) Continuation of application No. PCT/EP2016/076516, filed on Nov. 3, 2016.

(30) Foreign Application Priority Data

Dec. 8, 2015   (DE) .................... 10 2015 224 574

(51) Int. Cl.
*H02K 17/16*     (2006.01)
*H02K 15/00*     (2006.01)

(52) U.S. Cl.
CPC ....... *H02K 15/0012* (2013.01); *H02K 17/165* (2013.01)

(58) Field of Classification Search
CPC .................... H02K 17/165; H02K 15/0012
See application file for complete search history.

(56) References Cited

U.S. PATENT DOCUMENTS

4,309,635 A    1/1982   Sei et al.
5,419,217 A    5/1995   Umezawa et al.
(Continued)

FOREIGN PATENT DOCUMENTS

CN    104868622 A    8/2015
DE    88 03 915 U1    5/1988
(Continued)

OTHER PUBLICATIONS

International Search Report (PCT/ISA/210) issued in PCT Application No. PCT/EP2016/076333 dated Jan. 26, 2017 with English translation (seven pages).
(Continued)

*Primary Examiner* — Dang D Le
(74) *Attorney, Agent, or Firm* — Crowell & Moring LLP

(57) ABSTRACT

A rotor for an asynchronous machine includes a laminated core and a short-circuit cage at least partially integrated in the laminated core. The short-circuit cage is designed with rods having or consisting of a first electrically conductive material and with short-circuit rings having or consisting of a second electrically conductive material. The short-circuit rings are indirectly or directly frictionally welded to the rods.

13 Claims, 3 Drawing Sheets

(56) References Cited

U.S. PATENT DOCUMENTS

| | | | |
|---|---|---|---|
| 6,184,606 B1* | 2/2001 | Pyrhonen | H02K 17/165 310/182 |
| 2004/0113508 A1* | 6/2004 | Yasuhara | H02K 15/0012 310/211 |
| 2007/0247015 A1 | 10/2007 | Dellinger | |
| 2012/0217837 A1 | 8/2012 | Kleber | |
| 2012/0293036 A1 | 11/2012 | Kleber et al. | |
| 2013/0020899 A1 | 1/2013 | Kleber | |
| 2014/0132105 A1* | 5/2014 | Kleber | H02K 15/0012 310/211 |
| 2014/0368082 A1 | 12/2014 | Barton | |
| 2016/0352200 A1 | 12/2016 | Kaneda et al. | |

FOREIGN PATENT DOCUMENTS

| | | |
|---|---|---|
| DE | 43 08 683 A1 | 9/1994 |
| DE | 691 04 016 T2 | 1/1995 |
| DE | 199 04 481 A1 | 8/2000 |
| DE | 102 58 029 A1 | 7/2003 |
| DE | 10 2012 208 006 A1 | 11/2012 |
| DE | 10 2013 218 473 A1 | 3/2015 |
| DE | 10 2013 221 795 A1 | 4/2015 |
| DE | 10 2015 102 420 A1 | 8/2015 |
| DE | 10 2014 208 887 A1 | 11/2015 |
| EP | 1 347 560 A1 | 9/2003 |
| EP | 2 804 297 A2 | 11/2014 |
| JP | 2004-236456 A | 8/2004 |
| JP | 2013-240234 A | 11/2013 |
| WO | WO 2013/172120 A1 | 11/2013 |
| WO | WO 2015/129421 A1 | 9/2015 |

OTHER PUBLICATIONS

German-language Written Opinion (PCT/ISA/237) issued in PCT Application No. PCT/EP2016/076333 dated Jan. 26, 2017 (seven pages).

German-language Search Report issued in counterpart German Application No. 10 2015 224 577.2 dated Oct. 18, 2016 with partial English translation (13 pages).

International Search Report (PCT/ISA/210) issued in PCT Application No. PCT/EP2016/076334 dated Jan. 26, 2017 with English translation (seven pages).

German-language Written Opinion (PCT/ISA/237) issued in PCT Application No. PCT/EP2016/076334 dated Jan. 26, 2017 (eight pages).

German-language Search Report issued in counterpart German Application No. 10 2015 224 579.9 dated Oct. 18, 2016 with partial English translation (13 pages).

International Search Report (PCT/ISA/210) issued in PCT Application No. PCT/EP2016/076516 dated Jan. 26, 2017 with English translation (seven pages).

German-language Written Opinion (PCT/ISA/237) issued in PCT Application No. PCT/EP2016/076516 dated Jan. 26, 2017 (seven pages).

German-language Search Report issued in counterpart German Application No. 10 2015 224 574.8 dated Oct. 18, 2016 with partial English translation (12 pages).

Chinese-language Office Action issued in counterpart Chinese Application No. 201680050367.1 dated Mar. 19, 2019 with English translation (13 pages).

* cited by examiner

ROTOR, METHOD FOR PRODUCING A ROTOR, ASYNCHRONOUS MACHINE, AND VEHICLE

CROSS REFERENCE TO RELATED APPLICATIONS

This application is a continuation of PCT International Application No. PCT/EP2016/076516, filed Nov. 3, 2016, which claims priority under 35 U.S.C. § 119 from German Patent Application No. 10 2015 224 574.8, filed Dec. 8, 2015, the entire disclosures of which are herein expressly incorporated by reference.

This application contains subject matter related to U.S. application Ser. Nos. 16/001,097 and 16/001,121, both entitled "Rotor, Method for Producing a Rotor, Asynchronous Machine, and Vehicle" filed on even date herewith.

BACKGROUND AND SUMMARY OF THE INVENTION

The present invention relates to a rotor, a method for producing a rotor, an asynchronous machine and a vehicle. The present invention relates, in particular, to a rotor for an asynchronous machine, a method for producing a rotor for an asynchronous machine, an asynchronous machine, in particular for a drive of a vehicle, and a vehicle, in particular a passenger car and/or a hybrid vehicle.

In many technical applications, in particular when driving vehicles and their components, asynchronous machines are used. Such machines are also referred to as three-phase asynchronous machines or three-phase induction machines. In such machines, a rotor and a stator interact with one another via rotational magnetic fields, wherein in the generator mode the rotor leads the stator rotational field, and in the motor mode the rotor lags the stator rotational field.

In passive asynchronous machines, the rotor is formed by a short-circuit rotor or cage rotor. Such a rotor is composed of a laminated core, in particular of an iron laminated core with grooves formed in it, wherein the laminations are electrically insulated from one another. Rods are usually introduced into the grooves in the laminated core during production and electrically short-circuited via short-circuit rings, which can be done by means of a casting process.

It is problematic that substitution of materials in order to improve the electrical conductance values, on the one hand, and increasing the mechanical stability, on the other, cannot be carried out with known production methods, or can only be carried out with considerable additional expenditure in terms of material and energy costs.

The invention is based on the object of specifying a rotor for an asynchronous machine which makes the design and the operation of an asynchronous machine more reliable without increasing the expenditure during production. In addition, the invention is based on the object of specifying a corresponding production method for a rotor, an asynchronous machine and a vehicle and of developing it correspondingly.

The object on which the invention is based is achieved according to the invention with a rotor for an asynchronous machine, a method for manufacturing a rotor for an asynchronous machine, an asynchronous machine so provided, and a vehicle with the asynchronous machine, in accordance with embodiments of the invention.

A rotor according to the invention for an asynchronous machine has a laminated core and a short-circuit cage (also known as a "squirrel" cage) which is at least partially integrated into the laminated core. In the case of the rotor according to the invention, the short-circuit cage is constructed with rods made with or from a first electrically conductive material and short-circuit rings made with or from a second electrically conductive material. The short-circuit rings are constructed with an indirect or direct friction-welded connection to the rods. Owing to the friction-welded connection between the short-circuit rings and the rods of the short-circuit cage, the rotor can be developed in a particularly flexible way with respect to the first and second materials used for the rods and/or the short-circuit rings without additional expenditure with respect to the consumption of energy and materials. A connection between the material of the rods of the short-circuit cage and the short-circuit rings is carried out in a simple way by the friction-welded connection, with the result that additional expenditure in terms of energy or costs, for example in conjunction with a casting process, is eliminated.

In one advantageous development of the rotor according to the invention, the rods of the short-circuit cage have a cast and/or joined structure.

Alternatively or additionally, one or more of the short-circuit rings, in particular all the short-circuit rings, can be constructed as end rings of the short-circuit cage.

In particular, a structure is possible which has exclusively two short-circuit rings, specifically in the form of end rings.

Owing to the possibility of the more flexible selection of materials for the materials of the rods of the short-circuit cage, on the one hand, and of the short-circuit rings, on the other, according to a further development of the rotor according to the invention it is possible for the first material to have a higher electrical conductivity than the second material.

Alternatively or additionally, the second material can have greater mechanical strength and/or stability than the first material.

In this context, a careful selection of the materials in combination with one another can improve overall both electrical properties and the mechanical integrity of the rotor according to the invention.

Therefore, according to one development of the rotor according to the invention, it is contemplated for the first material and/or the second material to be a material from the group which comprises aluminum, copper, silver and alloys thereof, and in particular the first material is or has copper or a copper alloy, and the second material is or has aluminum or an aluminum alloy.

In order to improve the electrical contact between the rods of the short-circuit cage and the short-circuit rings and/or in order to suppress corrosion problems, according to a particularly preferred embodiment of the rotor according to the invention it is contemplated that at least one deflector plate is constructed. The at least one deflector plate is arranged between the rods and one of the short-circuit rings and is connected in an electrically conductive fashion to the rods and the short-circuit ring, wherein the connection of the at least one deflector plate to the at least one short-circuit ring is a friction-welded connection.

According to another aspect of the present invention, a method for manufacturing a rotor for an asynchronous machine is provided.

In terms of processing technology, the present invention is based on the fact that a rotor for an asynchronous machine, comprising a laminated core and a short-circuit cage which is at least partially integrated into the laminated core, is processed. The short-circuit cage is constructed with rods made with or from a first electrically conductive material and short-circuit rings made with or from a second electrically conductive material. The short-circuit rings are constructed with an indirect or direct friction-welded connection to the rods.

The production method according to the invention for the rotor can also be developed in an analogous fashion to the structural advantages of the rotor according to the invention for an asynchronous machine.

It is therefore possible for the rods of the short-circuit cage to be cast and/or joined.

Alternatively or additionally thereto, one or more short-circuit rings can be constructed as end rings.

In order to improve the electrical properties and/or the mechanical integrity of the rotor according to the invention overall, in one development of the production method according to the invention there is provision that a material with a higher electrical conductivity than that of the second material is used as the first material, and/or that a material with greater mechanical strength and/or stability than that of the first material is used as the second material.

In this context, in particular a material from the group which comprises aluminum, copper, silver and alloys thereof can be used as the first material and/or as the second material. In particular copper or a copper alloy can be used as the first material and/or aluminum or an aluminum alloy can be used as the second material.

In order to improve the electrical properties and to avoid corrosion problems with the rotor to be processed for an asynchronous machine, in one development of the production method according to the invention there is provision that at least one deflector plate is constructed. The at least one deflector plate is arranged between the rods and one of the short-circuit rings and is connected in an electrically conductive fashion to the rods and the short-circuit ring and the connection of the at least one deflector plate to the at least one short-circuit ring is constructed by friction welding.

According to a further aspect of the present invention, an asynchronous machine is provided, in particular for the drive and/or as a generator of a vehicle. The asynchronous machine according to the invention comprises a rotor and a stator, wherein the rotor has the structure according to the invention.

In addition, the present invention also provides a vehicle, in particular a passenger car, a battery-powered electric vehicle and/or a hybrid vehicle which has an asynchronous machine which is configured according to the invention and is constructed as part of a drive and/or of a generator of the vehicle.

The asynchronous machine according to the invention can also be used in any other devices as a drive and/or as a generator component, e.g. in working machines or machine tools, in particular in a circular saw, in pumps, e.g. water pumps, in hydraulic generators and wind-powered generators and the like.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments of the invention are described in detail below with reference to FIGS. 1 to 5. Identical and equivalent as well as identically or equivalently acting elements and components are denoted by the same reference symbols. The detailed description of the denoted elements and components is not given in every case of its occurrence.

The presented features and further properties can be separated from one another in any desired form and combined with one another in any desired form without departing from the core of the invention.

Figure 1:
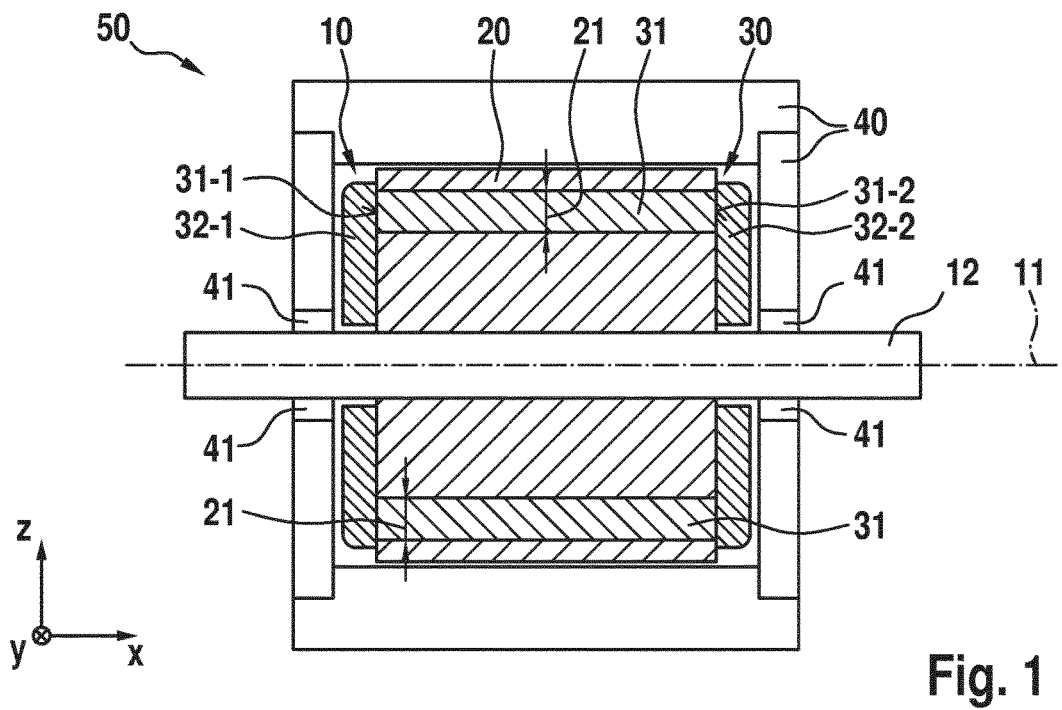
FIG. 1 is a schematic and partially sectional side view of the structure of an embodiment of an asynchronous machine according to the invention.

FIG. 1 shows a schematic and sectional side view of an embodiment of the asynchronous machine 50 according to the invention. The asynchronous machine 50 is composed of a stator 40, in the interior of which a rotor 10 with a rotor shaft 12 is arranged mounted by way of bearings 41. The rotor shaft 12 defines a rotational axis 11 of the rotor 10. The individual components of the rotor 10 are connected in a rotationally fixed fashion to the shaft 12. The rotational axis 11, which is defined by means of the rotor shaft 12, is oriented parallel to the direction represented as the x-axis in FIG. 1.

The rotor itself comprises, in addition to the rotor shaft 12 a laminated core 20, which is formed from thin laminations which are electrically insulated from one another and are made, for example, from iron or the like. The laminated core 20 is constructed with a plurality of grooves 21 or recesses, here in the longitudinal direction parallel to the rotational axis 11 but an oblique profile is also contemplated, in which the individual laminations are rotated through at least an inclination angle about the axis 11, for example. The grooves 21 are equipped with rods 31, which are also referred to as cage rods. At the ends 31-1 and 31-2, the rods 31 are connected to—here end-positioned—short-circuit rings 32-1 and 32-2, which are electrically conductive and as a result electrically short-circuited.

The first short-circuit ring 32-1 and the first ends 31-1 of the rods 31 of the short-circuit cage 30 are connected to one another in a materially joined and electrically conductive fashion by way of a friction-welded connection.

The second short-circuit ring 32-2 is connected in a materially joined and electrically conductive fashion to the second ends 31-2 of the rods 31 of the short-circuit cage 30 by a friction-welded connection.

Owing to the friction-welded connection between the first and second ends 31-1, 31-2 of the rods 31 of the short-circuit cage 30 and the insides or inner faces of the first and second short-circuit rings 32-1, 32-2, the material selection with respect to the material of the rods 31, on the one hand, and with respect to the material of the short-circuit rings 32-1, 32-2, on the other, can be configured as desired as long as material joining is possible by means of a friction-welded connection, in order, for example, to be able to allow better consideration, for example, for aspects of particularly good electrical conductivity of the rods 31, on the one hand, and of particularly good mechanical durability of the short-circuit rings 32-1, 32-2, on the other.

According to the invention it is, in particular, no longer necessary to construct the rods 31 and the short-circuit rings 32-1, 32-2 from the same material and/or in the same working step and with the same production methods.

Figure 2:
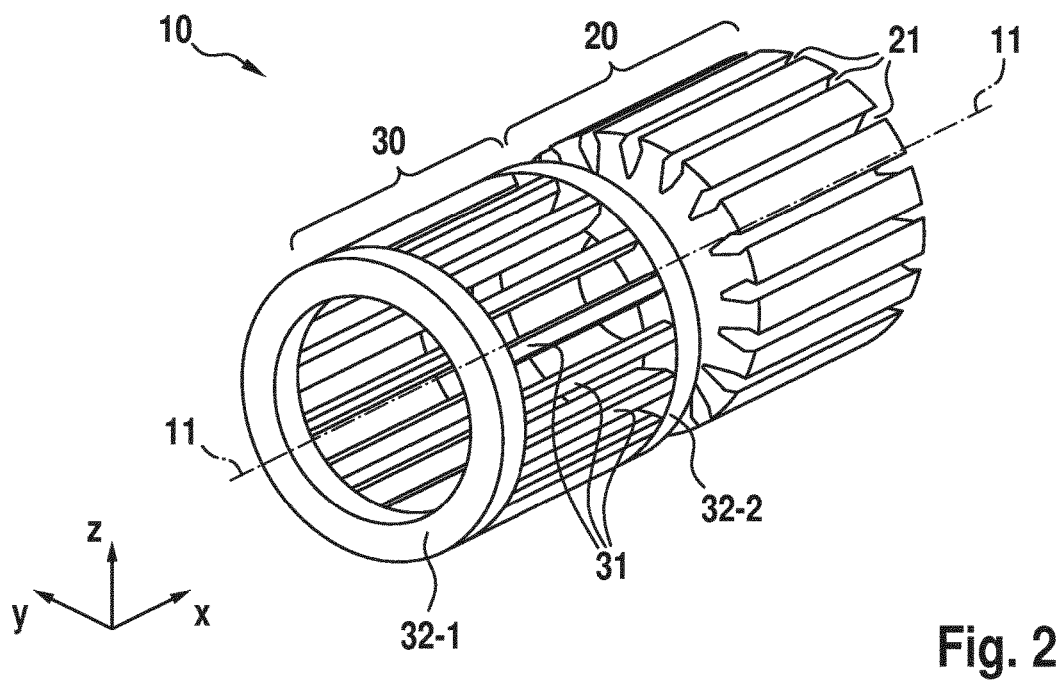
FIG. 2 is an exploded illustration of an embodiment of the rotor according to the invention which can be used as a short-circuit rotor for an asynchronous machine.

FIG. 2 shows, in the manner of an exploded illustration, an embodiment of the rotor 10 according to the invention with a short-circuit cage 30 (also known as a "squirrel" cage) with rods 31 and end-positioned short-circuit rings 32-1 and 32-2, and with a laminated core 20 with grooves 21, constructed parallel to the rotor axis 11, for receiving the rods 31.

Figure 3:
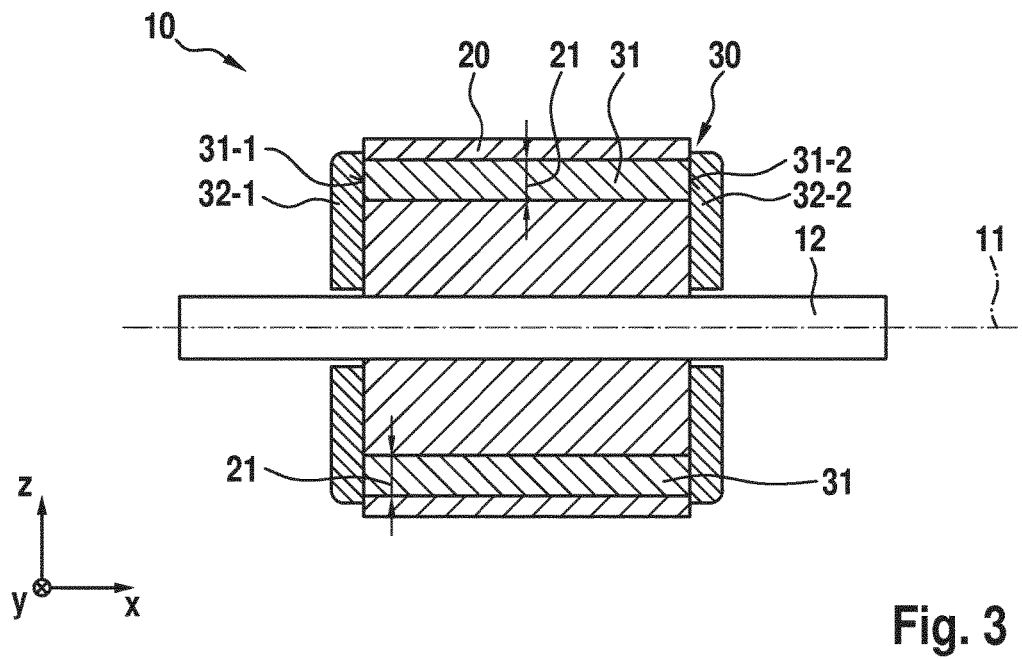
FIGS. 3 and 4 are a schematic and partially sectional side view, respectively, of embodiments of the rotor according to the invention, specifically with and without a deflector plate.

FIG. 3 shows a schematic and sectional side view of an embodiment of a rotor 10 according to the invention. This corresponds essentially to the rotor 10 as is used in the embodiment of the inventive asynchronous machine 50 according to FIG. 1.

The rotor axis 11 is defined by a rotor shaft 12. The further components of the rotor 10 are connected in a rotationally fixed fashion to this rotor shaft 12. This involves, in particular, a laminated core 20 with grooves 21 which are constructed parallel to the rotor axis 11 or recesses in which rods 31 of a short-circuit cage 30 are received. The rods 31 are themselves connected in a materially joined and electrically conductive fashion by their first ends 31-1 on the inside of a first short-circuit ring 32-1 by a friction-welded connection. The second ends 31-2, lying opposite the first ends 31-1 of the rods 31 of the short-circuit cage 30 are connected in a materially joined and electrically conductive fashion to the inside of an end-positioned second short-circuit ring 32-2 lying opposite by a friction-welded connection.

Figure 4:
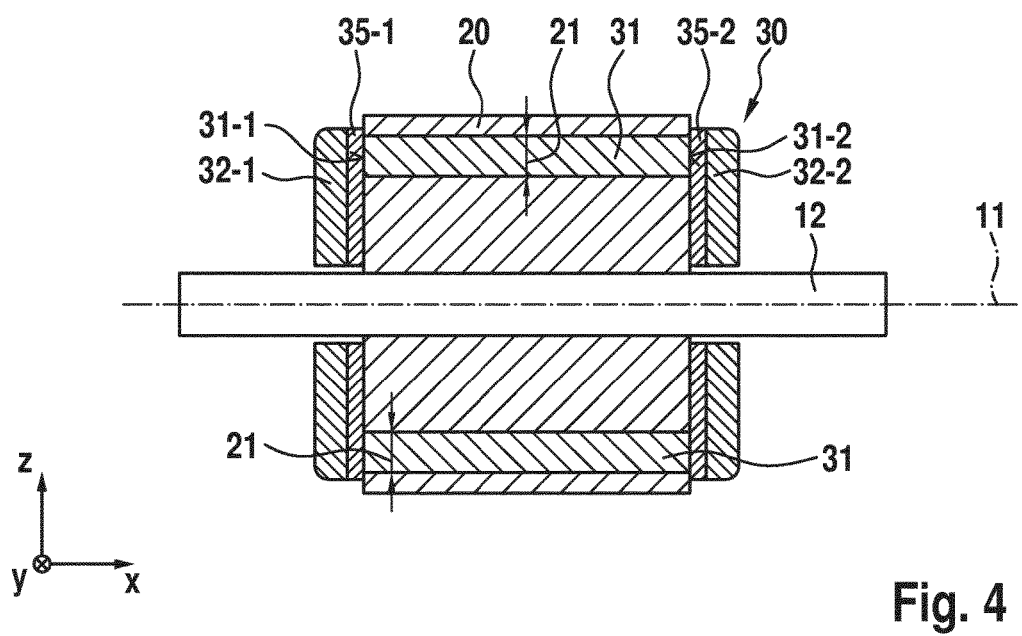

FIG. 4 shows a schematic and sectional side view of another embodiment of the rotor 10 according to the invention.

The structure of this embodiment of the rotor 10 according to the invention is similar to the structure of the rotor 10 shown in FIGS. 1 and 3. However, in the embodiment according to FIG. 4 it is decisive that a driving pulley 35-1 or 35-2 is constructed in each case in order to form better contact and/or in order to avoid corrosion problems between the rods 31 of the short-circuit cage 30 and, in particular, the ends 31-1, 31-2 thereof and the end-positioned short-circuit rings 32-1, 32-2.

In the arrangement according to FIG. 4, the short-circuit rings 32-1 and 32-2 can be connected directly with their insides in frictional engagement in a materially joined and electrically conductive fashion on the respective outside of the first and/or second driving pulley 35-1, 35-2. In this way an only indirect connection is brought about between the first and second short-circuit rings 32-1, 32-2 and the rods 31 of the short-circuit cage 30. This can avoid contact problems when there is direct contact between the short-circuit rings 32-1, 32-2 and the rods 31, since the material of the driving pulleys 35-1, 35-2 is selected to be an electrochemical intermediary.

Figure 5:
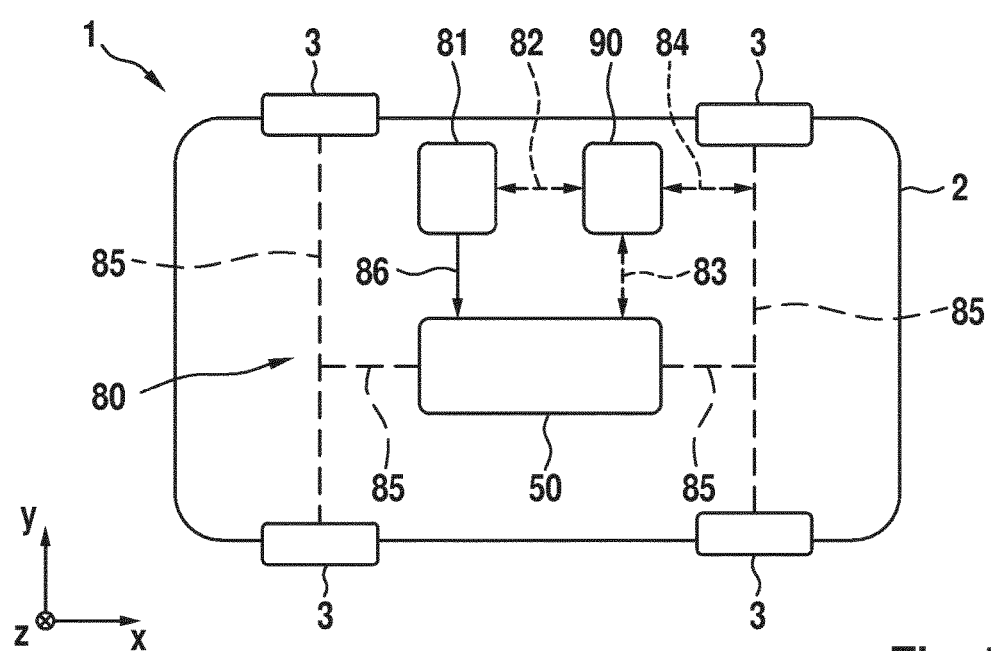
FIG. 5 is a schematic side view of a vehicle configured according to the invention.

FIG. 5 shows an embodiment of a vehicle 1 according to the invention, using an embodiment of the asynchronous machine 50 according to the invention for a drive 80.

In the schematic illustration in FIG. 5, the vehicle 1 according to the invention has a chassis 2 and four wheels 3 which can be driven via a drivetrain 85 by way of the asynchronous machine 50, constructed according to the invention, in order to propel the vehicle 1. In this context, the vehicle 1 according to the invention can be a purely electrically driven vehicle or a hybrid vehicle.

The inventive asynchronous machine 50 of the drive 80 is supplied by an energy source, in particular a battery 81, via a supply line 86. The function and operation of the battery 81, of the asynchronous machine 50 and of the drivetrain 85 are monitored and/or controlled by way of a control unit 90, via control/communication lines 82, 83 and 84.

This and further features and properties of the present invention are explained further with reference to the following illustrations.

The rotor 10 of an asynchronous machine 50, which is also referred to as a short-circuit rotor or cage rotor 30, is composed of an iron laminated core 20, consisting of laminations which are insulated with respect to one another, and have punched-in grooves 21.

When asynchronous rotors 10 are processed, the short-circuit cage 30 with rods 31 and end rings 32-1, 32-2 can be introduced into the laminated core 20 by a casting process, e.g. by way of an aluminum die casting process.

The cast rotor rods 31 are provided on both sides with short-circuit rings 32-1, 32-2, and therefore form the electrically conductive short-circuit rotor 30.

If the conductive material of the cage rotor 10 is composed of aluminum, only relatively small efficiency levels can be achieved owing to the relatively poor conductivity compared to copper.

The efficiency level of the asynchronous machine 50 can be improved by replacing a material with a relatively low conductance value, e.g. aluminum, with another suitable material with a relatively high conductance value such as e.g. copper.

Complete replacement of aluminum with copper not only gives rise to increased fabrication costs and material costs but also disadvantages in terms of strength. For reasons of cost and strength, it is recommended to use a more economical, but mechanically more stable and/or strong material outside the conductor grooves 21, i.e. in particular on the end rings 32-1, 32-2.

Hybrid rotors are also contemplated. In such rotors, the grooves 21 are equipped with copper rods. The short-circuit rings 32-1, 32-2 can be produced by an aluminum die casting process.

In a method in which the rods 31 are cast primarily from copper and the end rings 32-1, 32-2 are cast by way of an aluminum die casting process, during production the casting process has a disadvantageous effect—in terms of tooling costs, post-processing, energy costs for melting the metal— as do subsequent processing steps.

According to the invention, it is proposed, in contrast, to introduce the rods 31 of the rotor 10 or of the cage rotor composed of a highly conductive material, for example copper, by way of a casting process or by joining.

The connection of the short-circuit rings 32-1, 32-2, e.g. as end rings, composed of a less conductive material, for example aluminum, can be carried out directly to the short-circuit rods 31 by a friction welding method.

Alternatively, it is possible to connect the end rings 32-1, 32-2 by the friction welding method using a driving pulley 35-1, 35-2 which has been cast on or secured by means of an alternative method, said driving pulley 35-1, 35-2 also being referred to as a deflector plate.

Depending on the requirements, by means of the proposed method it is possible to use a suitable material with high strength and/or high electrical conductivity for the end rings 32-1, 32-2.

Inter alia, the following advantages are obtained:

(1) by virtue of the fact that the grooves 21 are filled completely with a highly conductive material (e.g. copper), good electrical conductivity occurs, as a result of which machines with maximum efficiency levels become possible.

(2) in the short-circuit rings 32-1, 32-2 the current density becomes less problematic, which justifies the use of other suitable materials there.

(3) as a result of the use of cost-effective materials for the end rings 32-1, 32-2, for example aluminum, there is a saving compared to the material for the short-circuit rings 32-1, 32-2 (copper) which are composed exclusively of copper.

(4) strength problems in, for example, applications with high rotational speeds can be reduced by using stronger materials or alloys for the short-circuit rings 32-1, 32-2.

(5) as a result of the use of materials with a relatively low density, for example aluminum, as the end rings 32-1, 32-2 it is possible to achieve weight savings.

(6) casting methods for the end rings 32-1, 32-2 are associated with high costs in terms of tooling and energy. New materials for the short-circuit rings 32-1, 32-2 permit production methods which are more favorable in terms of energy and cost.

(7) as a result of the use of a friction welding method the shrink holes which occur in the end rings 32-1, 32-2 with a casting process may be avoided. This gives rise to less imbalance in the rotor 10 and to easier balancing of the arrangement.

LIST OF REFERENCE NUMERALS

1 Vehicle
2 Chassis
3 Wheels
10 Rotor
11 Rotor axis
12 Rotor shaft
20 Laminated core
21 Groove, Recess
30 Short-circuit cage
31 Rod
31-1 (First) end/rod end
31-2 (Second) end/rod end
32-1 (First) short-circuit ring/end ring
32-2 (Second) short-circuit ring/end ring
35-1 (First) driving pulley/deflector plate
35-2 (Second) driving pulley/deflector plate
40 Stator
41 Bearing
50 Asynchronous machine
80 Drive
81 Battery
82 Control/communication line
83 Control/communication line
84 Control/communication line
85 Drivetrain
86 Supply line
90 Control unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor for an asynchronous machine, comprising:
a laminated core;
a short-circuit cage which is at least partially integrated into the laminated core, wherein
the short-circuit cage comprises
rods made with or from a first electrically conductive material, and
short-circuit rings made with or from a second electrically conductive material,
wherein the short-circuit rings are constructed with an indirect or direct friction-welded connection to the rods, and
at least one deflector plate, wherein
the at least one deflector plate is arranged between the rods and one of the short-circuit rings, extends radially outside of the rods, and is connected in an electrically conductive fashion to the rods and the short-circuit ring, and
the connection of the at least one deflector plate to the at least one short-circuit ring is a friction-welded connection.

2. The rotor as claimed in claim 1, wherein
the rods are constructed in or with a cast and/or joined structure, and/or
one or more of the short-circuit rings are constructed as end rings.

3. The rotor as claimed in claim 1, wherein
the first material has a higher electrical conductivity than the second material, and/or
the second material has greater mechanical strength and/or stability than the first material.

4. The rotor as claimed in claim 1, wherein
the first material and/or the second material is a material from the group which comprises: aluminum, copper, silver and alloys thereof.

5. The rotor as claimed in claim 4, wherein
the first material is or has copper or a copper alloy, or
the second material is or has aluminum or an aluminum alloy.

6. An asynchronous machine, comprising:
a stator; and
a rotor as claimed in claim 1.

7. A vehicle, comprising:
an asynchronous machine constructed as part of a drive and/or of a generator of the vehicle, wherein
the asynchronous machine comprises the rotor as claimed in claim 1.

8. The vehicle as claimed in claim 7, wherein
the vehicle is a passenger car, a battery-powered electric vehicle and/or a hybrid vehicle.

9. A method for manufacturing a rotor for an asynchronous machine, the rotor comprising a laminated core and a short-circuit cage which is at least partially integrated into the laminated core, the method comprising the acts of:
constructing the short-circuit cage with rods made with or from a first electrically conductive material and short-circuit rings made with or from a second electrically conductive material; and
indirectly or directly friction welding the short-circuit rings to the rods, wherein
at least one deflector plate is constructed,
the at least one deflector plate is arranged between the rods and one of the short-circuit rings, extends radially outside of the rods, and is connected in an electrically conductive fashion to the rods and the short-circuit ring, and
the connection of the at least one deflector plate to the at least one short-circuit ring is constructed by friction welding.

10. The method as claimed in claim 9, wherein
the rods are cast and/or joined, and/or one or more of the short-circuit rings are constructed as end rings.

11. The method as claimed in claim 9, wherein
a material with a higher electrical conductivity than that of the second material is used as the first material, and/or
a material with greater mechanical strength and/or stability than that of the first material is used as the second material.

12. The method as claimed in claim 9, wherein
a material from the group which comprises aluminum, copper, silver and alloys thereof is used as the first material and/or as the second material.

13. The method as claimed in claim 12, wherein
copper or a copper alloy is used as the first material and/or aluminum or an aluminum alloy is used as the second material.

* * * * *